United States Patent [19]

Krieg et al.

[11] Patent Number: 5,698,605
[45] Date of Patent: Dec. 16, 1997

[54] FLAME-RESISTANT POLYMETHACRYLIMIDE FOAMS

[75] Inventors: Manfred Krieg, Darmstadt; Werner Geyer, Muehltal; Wolfgang Pip, Darmstadt, all of Germany

[73] Assignee: Roehm GmbH Chemische Fabrik, Darmstadt, Germany

[21] Appl. No.: 803,773

[22] Filed: Feb. 24, 1997

[30] Foreign Application Priority Data

Feb. 22, 1996 [DE] Germany .................. 196 06 530.5

[51] Int. Cl.$^6$ .................................................. C08J 9/00
[52] U.S. Cl. ................... 521/77; 521/135; 521/149; 521/183
[58] Field of Search ................. 521/77, 149, 135, 521/183

[56] References Cited

U.S. PATENT DOCUMENTS

| | | | |
|---|---|---|---|
| 3,627,711 | 12/1971 | Schroeder et al. | 521/94 |
| 3,888,945 | 6/1975 | Arndt et al. | 521/149 |
| 4,576,971 | 3/1986 | Baumgartner et al. | 521/149 |
| 4,885,317 | 12/1989 | Thein et al. | 521/149 |
| 5,225,449 | 7/1993 | Tada et al. | 521/149 |

*Primary Examiner*—Morton Foelak
*Attorney, Agent, or Firm*—Oblon, Spivak, McClelland, Maier & Neustadt, P.C.

[57] ABSTRACT

A composition includes a polymethacrylimide polymer which is polymerized in the presence of an epoxy resin and a flame-inhibiting agent. Further, a process is described for making flame-resistant polymethacrylimide, which includes mixing an epoxy resin and a flame-inhibiting agent with a methacrylic acid and methacrylonitrile, and polymerizing. A polymethacrylimide foam so prepared has an LOI value of at least 25 and retains the good mechanical properties that are associated with polymethacrylimide foams.

16 Claims, No Drawings

FLAME-RESISTANT POLYMETHACRYLIMIDE FOAMS

BACKGROUND OF THE INVENTION

1. Field of the Invention

The invention relates to polymethacrylimide foams with flame-inhibiting additives.

2. Discussion of the Background

Polymethacrylimide foams are well known (see e.g. DE-C 27 26 260). Because of their high heat shape retention, good pressure resistance, and low density, they are useful in many applications, e.g. as a core material for laminated materials (cf. DE-C 28 22 885, DE-A 33 04 882, U.S. Pat. No. 4,316,934). Because of their light weight and strength, they are particularly useful as aircraft construction materials. Aircraft construction materials, however, must meet increasingly rigid standards with respect to flame resistance.

The flame resistance of a plastic material is given by its Lowest Oxygen Index value (LOI). The higher the LOI, the greater the flame resistance of the tested material. The LOI value corresponds to an oxygen/nitrogen gas mixture in which a plastic sample will burn completely when lit. The LOI is determined by ASTM Standard D 2863: Standard Method of Test for Flammability of Plastics Using the Oxygen Index Method. In the case of polymethacrylimide foams, high LOI values, e.g. above 23, can only be achieved by adding flame-inhibiting or -protecting agents.

Flame-resistant polymethacrylimide foams are known. DE-PS 20 47 096 discloses a flame-resistant polymethacrylimide foam produced by heating a mixed polymerizate of methacrylonitrile, methacrylic acid, methyl methacrylate, and maleic acid anhydride, using formic acid as the propellant and phosphoric acid and dibromopropyl phosphate as flame-inhibiting additives. When heated to 150°–200° C., the methacrylonitrile and methacrylic acid units cyclize to form methacrylimide units. Unfortunately, these foams absorb water because of the phosphorus compounds they contain, which compounds are typically present on the order of 1.5–3 wt. %. This absorbed water acts as a plasticizer, which negatively effects the mechanical properties of the foam.

The above-identified problems are solved, to some extent, by using organic phosphorus compounds such as dimethyl methane phosphonate (DMMP) or alkoxycarbonyl methane phosphonic acid diethyl ester (EP-B 146 892). To impart an adequate level of flame resistance to polymethacrylimide foams, however, high concentrations of these compounds are required (5–15 wt. %). Using these organic phosphorus compounds alone, LOI values of only about 24 can be achieved, but again, this higher level of flame resistance comes at the expense of mechanical properties such as pressure resistance.

Epoxy resins are known to be relatively flame-resistant plastics (see, for example, M. W. Ranney (1974): Fire Resistant and Flame Retardant Polymers, Noyes Data Corporation, Park Ridge, N.J., London, England, p. 123–126). However, non-cured epoxy resins are not known to have any flame-inhibiting effect when used in polymethacrylimide foams.

Accordingly, there remains a need for flame-resistant, low-density materials, e.g. polymethacrylimide foams, that have LOI values of at least 25 yet retain the desirable mechanical properties associated with polymethacrylimides. These materials would have immediate utility as structural materials for use in laminates or aircraft construction.

SUMMARY OF THE INVENTION

Accordingly, one object of the present invention is to improve the flame resistance of polymethacrylimide foams.

Another object of the present invention is to provide polymethacrylimide foams with high LOI values, but limit the amount of conventional flame-inhibiting agents, such as DMMP, contained therein.

Another object of the present invention is to provide polymethacrylimide foams with both high LOI values and good mechanical properties.

These and other objects of the present invention have been achieved by adding a conventional flame-inhibiting agent and an epoxy resin to a polymethacrylimide foam.

The first embodiment of the invention relates to a composition, which includes:

a polymethacrylimide polymer, wherein the polymethacrylimide polymer is formed by polymerization of methacrylic acid and methacrylonitrile in admixture with an epoxy resin and a flame-inhibiting agent.

The second embodiment of the present invention relates to a process for making flame-resistant polymethacrylimide, which includes:

mixing together an admixture containing:

an epoxy resin, a flame-inhibiting agent, methacrylic acid, methacrylonitrile, and optionally, a polymerization initiator, and polymerizing the admixture; and cyclizing and isomerizing the admixture.

The third embodiment of the present invention relates to a polymethacrylimide foam having an LOI value of at least 25.

By means of the present invention, flame-resistant polymethacrylimide foams with high LOI values and good mechanical properties can be obtained. Heretofore, it was completely unexpected that the combination of a conventional flame-inhibiting agent and epoxy resin in a polymethacrylimide foam would lead to such an improvement of the LOI values.

DETAILED DESCRIPTION OF THE PREFERRED EMBODIMENTS

Other features of the invention will become apparent in the course of the following descriptions of exemplary embodiments which are given for illustration of the invention and are not intended to be limited thereof.

Polymethacrylimide Foams:

Polymethacrylimide foams are characterized by recurring units with the structure:

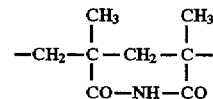

which make up more than 50 wt. %, preferably 60–90 wt. %, of the units of the polymerizate. More preferably, these recurring units make up from 70–90 wt. % of the units of the polymerizate. These ranges include all specific values and subranges therebetween, including 51, 55, 65, 75, 80, 85, 95, 99, and 100 wt. % of the units of the polymerizate.

The methacrylimide units form from adjacent units of methacrylic acid and methacrylonitrile when heated to 150° to 250° C., by means of a cyclizing isomerization reaction (cf. DE-C 18 17 156, DE-C 27 26 259, EP-B 146 892, the entire contents of which are incorporated by reference). Usually, a pre-product is first produced by polymerization of the admixed monomers in the presence of a radical initiator, at low temperatures, e.g. 30° to 60° C., with subsequent heating to 60° to 120° C., and this pre-product is then foamed by a propellant mixed therewith, by heating the pre-product to approximately 180°–250° C. (see EP-B 356 714, the entire contents of which are hereby incorporated by reference). In the present case, the formation by polymerization of polymethacrylimide can be taken to include polymerization to form the pre-product and the cyclization/isomerization conversion of the adjacent methacrylic acid and methacrylonitrile groups.

The monomer mixtures used for the production of the foams contain methacrylic acid and methacrylonitrile, preferably in a molar ratio between 2:3 and 3:2, as the main components. More preferably, the monomers are used in a molar ratio from 2.25:2.75; more particularly preferably from 1:1; and most preferably from 2.75:2.25. These ranges include all specific values and subranges therebetween, including 2.1:2.9, 2.2:2.8, 2.4:2.6, 2.6:2.4, 2.8:2.2, and 2.9:2.1.

Since conversion of the polymerized monomers to methacrylimide groups does not always proceed completely during heating of the reaction mixture and foaming, the polymerizates frequently contain small proportions of the initial monomer. Other non-imide-like units can come from other comonomers, whose polymerized units are more difficult to convert to cyclic imide groups, or cannot be converted to them at all. For example, esters of acrylic and methacrylic acid, particularly with $C_{1-4}$ lower alcohols, can be used as comonomers, as well as styrene, maleic acid or its anhydride, itaconic acid or its anhydride, vinyl pyrrolidone, vinyl chloride or vinylidene chloride may be added to the admixture. The proportion of comonomers should not exceed 30 wt. %, preferably 10 wt. % with respect to the total amount of monomers. More preferably, the proportion of comonomers should not exceed 5 wt. %. These ranges include all specific values and subranges therebetween, including 29, 25, 20, 15, 9, 4, and 1 wt. %.

Crosslinking agents can also be used in the admixture, e.g. allyl acrylate, allyl methacrylate, ethylene glycol diacrylate or ethylene glycol dimethacrylate, or multivalent metal salts of acrylic or methacrylic acid, such as magnesium methacrylate. These crosslinking agents may be in monomeric or oligomeric form. The proportion of the crosslinking agents can be, for example, 0.05 to 1 wt. % with respect to the total amount of monomers. More preferably, the proportion of these additional monomers can be 0.1 to 1 wt. %; more particularly preferably 0.5 to 1 wt. %; and most preferably 0.5 to 0.75 wt. %. These ranges include all specific values and subranges therebetween, including 0.06, 0.07, 0.2, 0.3, 0.4, 0.6, 0.7, 0.9, and 0.99 wt. %.

The polymerization initiators are not particularly limiting, and may be selected from those usually used for the polymerization of methacrylates; for example, azo compounds, such as azodiisobutyronitrile; as well as peroxides, such as bidenzoyl peroxide or dilauryl peroxide, or also other peroxide compounds, such as t-butyl peroctanoate, for example, or peracetals; as well as redox initiators, if necessary (cf. in this regard, for example, H. Rauch-Puntigam, Th. Völker, Acryl- and Methacrylverbindungen {Acryl and Methacryl Compounds}, Springer, Heidelberg, 1967, or Kirk-Othmer, Encyclopedia of Chemical Technology, Vol. 1, pages 286 ff, John Wiley & Sons, New York, 1978, the entire contents of which are hereby incorporated by reference). Preferably, the polymerization initiators are used in amounts of 0.01 to 0.3 wt. %, with reference to the starting materials. More preferably, the polymerization initiators are used in amounts of 0.05 to 0.3 wt. %; more particularly preferably in amounts of 0.1 to 0.275 wt. %; and most preferably in amounts of 0.2 to 0.25 wt %. these ranges include all specific values and subranges therebetween, including 0.051, 0.075, 0.125, 0.15, 0.225, and 0.29 wt. %.

It can also be advantageous to combine different polymerization initiators having different decomposition properties with respect to time and temperature. The simultaneous use of tert.-butyl perpivalate, tert.-butyl perbenzoate, and tert.-butyl per-2-ethyl hexanoate, for example, is well suited.

It is known that propellants which form a gas at 150° to 250° C., by means of decomposition or evaporation, serve to foam the pre-product during conversion to the polymethacrylimide. Propellants with an amide structure, such as urea, monomethyl urea of N,N'-dimethyl urea, formamide or monomethyl formamide release ammonia or amines upon decomposition, and these can contribute to the additional formation of imide groups. However, nitrogen-free propellants such as formic acid, water, or monovalent $C_{3-8}$ aliphatic alcohols, such as propanol, butanol, isobutanol, pentanol, or hexanol, can also be used. Propellants are usually added to the reaction admixture in amounts of approximately 0.5 to 3 wt. % with reference to the monomers. More preferably, propellants are used in amounts of 0.75 to 3 wt. %; more particularly preferably in amounts of 1 to 3 wt. %; and most preferably in amounts of 2 to 2.75 wt. % with reference to the monomers. These ranges include all specific values and subranges therebetween, including 0.6, 0.9, 1.1, 1.5, 1.9, 2.1, 2.5, and 2.9 wt. %.

In addition, alkali or alkali earth salts of acrylates or methacrylates, or zinc, zirconium, or lead, and acrylate or methacrylate salts thereof, or other compounds of these metals, as long as they are soluble in the monomer mixture, may be added as smoke-reducing agents (DE-C 27 26 260 (the entire contents of which are hereby incorporated by reference). The usual amounts are in the range of 0.5 to 2 wt. % with reference to the monomers. More preferably, the amount of smoke-reducing additives is in the range from 0.75 to 2 wt. %; more particularly preferably in the range of 1 to 2 wt. %; and most preferably in the range from 1 to 1.75 wt. % with reference to the monomers. These ranges include all specific values and subranges therebetween, including 0.6, 0.9, 1.1, 1.5, and 1.9 wt. %.

Electrically conductive particles may also be added in order to prevent buildup of electrostatic charges, pursuant to EP-B 356 714 (the entire contents of which are hereby incorporated by reference). Here, metal particles, e.g. aluminum, nickel, iron alloys, titanium or tin, or conductive carbon black, can be used. The amounts used may be in the range of 0.1 to 10 wt. % with reference to the monomers; preferably 1 to 4 wt. %. More preferably, the amounts used are in the range of 2 to 5 wt. %; more particularly preferably in the range of 2 to 5 wt. %; and most preferably in the range of 3 to 4 wt. % with reference to the monomers. These ranges include all specific values and subranges therebetween, including 0.2, 0.9, 1.1, 2.5, 3.5, 4.9, 6, 7, 8.5, 9, and 9.9 wt. %.

Flame-Inhibiting Additives:

Known halogen or phosphorus compounds may be used as flame-inhibiting additives. Organic phosphorus compounds pursuant to EP-B 146 892 (the entire contents of which are hereby incorporated by reference) are preferred. More preferably, the organic phosphorous compounds used are dimethyl methane phosphonate (DMMP), or alkoxycarbonyl methane phosphonic acid diethyl ester; most particularly preferred is DMMP. Usual amounts are in the range of approximately 5–15 wt. % with reference to the total amount. Preferably, the amount used is from 5–10 wt. %; more preferably from 5–9.5 wt. %; and most preferably from 5–7.5 wt. % with reference to the total amount. These ranges include all specific values and subranges therebetween, including 5.1, 6, 7, 8, 9, 9.9, 10.1, 11, 12.75, 13.5, 14, 14.5, and 14.9 wt. %. When using increasing amounts, for example of DMMP, the other thermal and mechanical properties of the foams generally also deteriorate.

Epoxy resins:

According to the invention, in order to achieve polymethacrylimide foams with good mechanical properties and higher LOI values, the polymethacrylimide is formed by polymerization of methacrylic acid and methacrylonitrile in admixture with a flame-inhibiting additive and an epoxy resin. The amount of epoxy resin is not particularly limiting. However the preferred amount of epoxy resin used is from 0.1–4 wt. %; more preferably 0.2–2.5 wt. %; and most preferably 0.4 to 2.1 wt. % of epoxy resin, with reference to the total amount in each instance. These ranges of epoxy resin include all specific values and subranges therebetween, including 0.25, 0.3, 0.5, 0.9, 1, 1.1, 2, 2.75, 3, 3.5, and 3.9 wt. %.

Epoxy resins are obtained by condensing an aromatic dihydroxy compound, such as bis-phenol A or bis-phenol F, with an epoxy, such as epichlorohydrin (1-chloro-2,3-epoxy propane). Also called liquid casting resins or reactive resins, epoxies can be cured using crosslinking agents, e.g. multifunctional alcohols or amines. Epoxy resins contain the condensation products of aromatic dihydroxy compounds and epoxy compounds as oligomers with molecular weights of approximately 500–2000 Daltons. A suitable reactive epoxy resin can contain, for example, bisphenol A/epichlorohydrin oligomers or bisphenol F/epichlorohydrin oligomers, or a combination of the two, and crosslinking agent such as 1,6-hexane diol diglycidyl ether. A particularly suitable reaction epoxy resin contains approximately 50 wt. % bisphenol A/epichlorohydrin oligomers, approximately 25 wt. % bisphenol F/epichlorohydrin oligomers, where the molecular weight of the oligomers lies at approximately 700 Daltons, as well as approximately 25 wt. % 1,6-hexane diol diglycidyl ether as the crosslinking agent. Corresponding products are commercially available (for example under the trade name Rütapox® 0166/S from Bakelite GmbH, Iserlohn, Germany).

Having generally described this invention, a further understanding can be obtained by reference to certain specific examples which are provided herein for purposes of illustration only and are not intended to be limiting unless otherwise specified.

EXAMPLE

Production of polymethacrylimide foams with various flame-inhibiting additives:

Different amounts of flame-inhibiting agents were added to a homogeneous mixture of 50 parts by weight (P) methacrylic acid and 50 P methacrylonitrile, 2.5 P formamide, 1 P $H_2O$, 0.1 P tert.-butyl perpivalate, 0.1 P tert.-butyl perbenzoate, 0.034 P tert.-butyl per-2-ethyl hexanoate, and 0.7 P ZnO.

The flame-inhibiting agents used were dimethyl methane phosphonate (DMMP) and the epoxy resin Rütapox® 0166/S (50 wt. % bisphenol A/epichlorohydrin oligomers, approximately 25 wt. % bisphenol F/epichlorohydrin oligomers, with a molecular weight of the oligomers of approximately 700 Daltons, approximately 25 wt. % 1,6-hexane diol diglycidyl ether as the crosslinking agent; manufactured by Bakelite GmbH, Iserlohn, Germany).

The mixtures were polymerized between two sheets of glass with a sealing cord around the circumference, for 48 h at 38° C., to form sheets with a size of 500×500×23 mm. The sheets were then tempered at 115 C. for 3 h. The polymerizate sheets obtained were then foamed by heating them to approximately 220° C. for 2 hours. The density of the foam sheets was determined in $kg/m^3$, their pressure resistance was determined according to DIN 53 421, their shape retention when subjected to heat according to DIN 53 424, and the LOI according to ASTM Standard D 2863.

The amounts of flame-inhibiting agents and the values determined can be seen in the table below.

| Mixture | A | B | C | D | E | F | G |
|---|---|---|---|---|---|---|---|
| DMMP (parts by weight) | 10 | 15 | 10 | 7.5 | 10 | 10 | 0 |
| Rütapox® 0166/S (parts by weight) | 0 | 0 | 0.5 | 0.5 | 1.5 | 2.0 | 1.0 |
| Density [kg/m³] | 74.6 | 75.2 | 73.1 | 65.7 | 88 | 143 | 75 |
| Pressure resistance [N/mm²] | 1.08 | 0.93 | 1.47 | 1.33 | n.d. | n.d. | 1.7 |
| Shape retention when subjected to heat [°C.] | 195 | 204 | 206 | 205 | n.d. | n.d. | 200 |
| LOI | 23 | 24 | 28 | 26 | 27 | 30 | 21 | n.d. = not determined

From the table, it is clear that the polymethacrylimide compositions of the invention, which have both an epoxy resin and a conventional flame-inhibiting agent, have higher LOI values, higher pressure resistances, and higher shape retention than compositions lacking either epoxy or the conventional flame-inhibiting agent.

The entire contents of German patent application 196 06 530.5, filed Feb. 22, 1996, are hereby incorporated by reference.

Obviously, numerous modification and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A composition, comprising:

a polymethacrylimide polymer foam, wherein the polymethacrylimide polymer is formed by polymerization of methacrylic acid and methacrylonitrile in admixture with an epoxy resin and a flame-inhibiting agent.

2. A composition of claim 1, wherein said epoxy resin is present in an amount from 0.1–4 wt. %, based on the total amount.

3. A composition of claim 2, wherein said epoxy resin is present in an amount from 0.2–2.5 wt. %, based on the total amount.

4. A composition of claim 3, wherein said epoxy resin is present in an amount from 0.4–2.1 wt. %, based on the total amount.

5. The composition of claim 1, wherein said epoxy resin comprises the condensation product of:

an aromatic dihydroxy compound;

an epoxy compound; and optionally, a crosslinking agent.

6. The composition of claim 5, wherein said aromatic dihydroxy compound is selected from the group consisting of bisphenol A, bisphenol F, and a mixture thereof.

7. The composition of claim 5, wherein said epoxy compound is epichlorohydrin.

8. The composition of claim 5, wherein said crosslinking agent is a multifunctional alcohol or a multifunctional amine.

9. The composition of claim 1, wherein said flame-inhibiting agent is selected from the group consisting of a halogen-containing agent, a phosphorous-containing agent, and a mixture thereof.

10. The composition of claim 9, wherein said phosphorous-containing agent is selected from the group consisting of dimethyl methane phosphonate, alkoxycarbonyl methane phosphonic acid diethyl ester, and a mixture thereof.

11. The composition of claim 10, wherein said phosphorous-containing agent is dimethyl methane phosphonate.

12. The composition of claim 1, wherein said polymethacrylimide polymer is a cyclized, isomerization product of adjacent methacrylic acid and methacrylonitrile groups.

13. The composition of claim 12, wherein said admixture further comprises:

an amide, formic acid, water a monovalent $C_{3-8}$ alcohol, or a mixture thereof as a propellant; and optionally, a comonomer selected from the group consisting of esters of acrylic and methacrylic acid, styrene, maleic acid or its anhydride, itaconic acid or its anhydride, vinyl pyrrolidone, vinyl chloride, vinylidene chloride, and mixtures thereof.

14. The composition of claim 1, further comprising electrically conductive particles.

15. The composition of claim 1, further comprising a smoke-reducing agent.

16. A flame-resistant article, comprising:

a polymethacrylimide foam having an LOI value of at least 25, wherein said polymethacrylimide foam is made by polymerizing methacrylic acid and methacrylonitrile in admixture with an epoxy resin and a flame inhibiting agent.

* * * * *